UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

FINISH-REMOVER.

1,167,641.  Specification of Letters Patent.  Patented Jan. 11, 1916.

No Drawing.  Application filed November 14, 1910.  Serial No. 592,342.

*To all whom it may concern:*

Be it known that I, CARLETON ELLIS, a citizen of the United States, and resident of Montclair, Essex county, New Jersey, have made certain new and useful Inventions relating to Finish-Removers, of which the following is a specification.

This invention relates to removers and relates especially to removers comprising carbon-tetrachlorid or other chlorinated or other solvents and prepared by the incorporation of suitable salt thickeners such as acetates in alcohol or other finish solvent material, thereby producing esterification or condensation products, if desired, with the incorporation of suitable strong sulfuric or other acid material.

Acetates, such as metallic acetates including potassium, ammonium, sodium, magnesium and barium acetates, are quite soluble in methyl, ethyl and other alcohols and in other allied loosening finish solvent materials (that is, solvents of a generally alcoholic character or action in removers) such as the allied ketonic solvents, including methyl ethyl ketone, methyl acetone (that is, a composition containing about 40% of acetone, some wood alcohol and the balance higher ketones) and acetone. The solution may be readily effected as by heating the alcoholic or similar solvent body in a reflux condenser in contact with an excess of the desired acetate or other salt capable of effecting esterification, suitable amounts of acid material such as strong or anhydrous sulfuric or hydrochloric acid being incorporated if desired, the temperature being carried up to near the boiling point of the solvents used. Or, if desired, the solution may take place in a digester preferably in the presence of an excess of the acetate, the pressure and temperature being carried up to any desired point to facilitate solution and the resulting esterification, although such increase of temperature is not always necessary to effect the desired conversion of the solvent material. Under such conditions the alcohol and strong acid which may be slowly added in amounts nearly sufficient to completely combine with the base of the acetate used react to form the corresponding metallic salt and acetic esters with the alcohol or other solvents employed, such acetic or similar esteric solvents materially adding to the finish softening and solvent action of the remover. Among other salts capable of effecting such esterification are other alcohol soluble salts preferably having organic acid radicals of the fatty or aromatic series, such as formates, propionates, butyrates, and so forth.

In the removal of finish by organic solvents, thickeners are often necessary especially when the compositions are used on vertical surfaces, so that the salts mentioned have a desirable thickening action. In these compositions the salts of sodium and potassium may be used as thickeners and also such inorganic bodies as sodium sulfate for instance, which may be produced in connection with the remover ingredients as indicated or added thereto, although the preferable salts or compounds added are those with an organic acid such as acetic, oxalic, lactic and the like. The organic solvents may be benzol and its derivatives, alcohols and the like, ketones, acids of an organic character and other bodies having generally similar solvent action in removers.

A suitable illustrative remover composition involving such components may be made by mixing three parts of acetone, two parts of toluol and four parts of sodium acetate. Wax, such as paraffin or spermaceti may be added, if desired, one or two per cent. being generally needed to prevent evaporation of these solvents. Another illustrative remover composition may be made by mixing three parts of wood alcohol, one part of acetic acid, one part of benzol and one-half part of benzin. One part of sodium oxalate and two to four parts of sodium acetate may be added to thicken these solvents.

Another illustrative remover of this character may be formed by incorporating seven parts of calcined sodium acetate with nine parts of denatured alcohol and two parts of methyl ethyl ketone, four parts of strong sulfuric acid being added so slowly as to prevent the formation of ethers, the mixture being preferably stirred in a closed digester or mixer having agitating means therein which may be provided with a reflux condenser. The sulfuric acid added is nearly sufficient to neutralize the base of the acetate used so as to form a considerable amount of acetic esters of the alcoholic and ketonic solvents, thus materially increasing their finish softening and solvent properties. Eleven parts of carbon-tetrachlorid in which one part of paraffin or other waxy material may if desired be dissolved, may then be incorporated with the mixture and also four parts of crude terpineol or pine oil and one-half part of anhydrous ammonium acetate which may of course be prepared by allowing dry ammonia gas to percolate through glacial acetic acid. The particles of sodium sulfate formed are agglomerated with the colloidal waxy material and uniformly distributed by the continued agitation of the mixture so as to give a very desirable stiffening material throughout the body of the remover. The presence of ammonium acetate keeps the remover alkaline by the esteric action of such acetate material, thus having a valuable antacid action and effectually neutralizing any acid tendency of the chlorinated solvents, the ammonia vapors protecting the portion of the container above the liquid which is of course desirable. It is not necessary to add ammonium acetate to such mixtures since any free ammonium salt incorporated will give a similar result when in the presence of acetates of basic metals capable of displacing the ammonia radical and having such esteric action as has been indicated. Instead of the sodium acetate referred to an equivalent amount of potassium or other acetate may be used, it being understood that calcined or other anhydrous salts are desirable in such removers to avoid hydrolysis. Instead of the crude terpineol referred to other penetrating finish solvent material, that is, finish solvents having generally benzolic character or action in removers comprising benzol, toluol, xylol, naphtha, benzin and other petroleum hydrocarbons, as well as wood turpentine, turpentine and terpineol may be used to some extent at least, although the more volatile and inflammable should only be used in small proportions if the non-inflammable character of the remover is important. Other chlorinated finish solvent material, such as chlorinated acetylene for instance may also be used and may replace to some extent at least carbon-tetrachlorid in such removers as indicated.

Another illustrative remover may comprise nine parts of grain alcohol, one part of wood alcohol, eleven parts of carbon-tetrachlorid, one part of ammonium acetate, one to three parts of amyl acetate which may be added in considerable quantity to such removers without materially increasing their inflammability, two parts of carbolic acid and one part of wax.

Another illustrative remover may comprise nine parts of denatured alcohol, one part of sodium acetate, one-half part of ammonium chlorid, five parts of carbon-tetrachlorid, five parts of cresylic acid, one part of wax, such as paraffin or ceresin, which may be conveniently dissolved in the carbon-tetrachlorid.

Another illustrative remover may comprise twelve parts of denatured alcohol, one part of amyl alcohol, eleven parts of carbon-tetrachlorid, five parts of wood-tar oil, one part of kerosene and one part of ammonium acetate which may be replaced if desired by one part of sodium acetate and one part of ammonium chlorid or sulfate.

Another illustrative remover may comprise eleven parts of denatured alcohol, one part of sodium acetate, one part of ammonium chlorid, nine parts of carbon-tetrachlorid with which one part of paraffin may be dissolved if desired.

The invention has been described in this case which comprises subject-matter taken from the Ellis United States patent applications Nos. 389,366, filed August 20, 1907, and No. 444,239, filed July 18, 1908, in connection with a number of illustrative ingredients, formulas, proportions and methods of preparation, to the details of which the invention is not of course to be limited.

What is claimed is:

1. A compound consisting of alcohol, benzol and an acetate of a metal.

2. A compound consisting of alcohol, benzol and an acetate of a metal dissolved therein.

3. A finish remover comprising organic solvents and sodium acetate.

4. A finish remover comprising benzol, alcohol and an organic salt of sodium as a thickener.

5. A finish remover comprising considerable proportions of penetrating and of loosening finish solvent material and a crystallizable organic salt of an alkali incorporated therewith.

6. A finish remover consisting largely of composite volatile organic solvent material including a penetrating solvent and a crystallizable metallic salt of a fatty acid incorporated therewith.

7. A finish remover comprising organic volatile finish solvent material and a crystallizable organic salt of a metal incorporated therewith.

CARLETON ELLIS.

Witnesses:
HARRY L. DUNCAN,
JESSIE B. KAY.